US012412160B2

(12) United States Patent
Garbacik

(10) Patent No.: US 12,412,160 B2
(45) Date of Patent: Sep. 9, 2025

(54) TANKER TRAILER DATA PLATES AND RELATED SYSTEMS

(71) Applicant: United Tank Parts, Inc., Melvindale, MI (US)

(72) Inventor: Chene Garbacik, Livonia, MI (US)

(73) Assignee: United Tank Parts, Inc., Melvindale, MI (US)

(*) Notice: Subject to any disclaimer, the term of this patent is extended or adjusted under 35 U.S.C. 154(b) by 217 days.

(21) Appl. No.: 18/092,879

(22) Filed: Jan. 3, 2023

(65) Prior Publication Data

US 2024/0220938 A1 Jul. 4, 2024

(51) Int. Cl.
| | | |
|---|---|---|
| *G06Q 30/00* | (2023.01) | |
| *G06K 7/14* | (2006.01) | |
| *G06Q 10/20* | (2023.01) | |
| *H04L 9/40* | (2022.01) | |

(52) U.S. Cl.
CPC ........... *G06Q 10/20* (2013.01); *G06K 7/1417* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 9,902,607 | B2 | 2/2018 | Evans |
| 11,087,192 | B2 | 8/2021 | Amisar |
| 2009/0172979 | A1* | 7/2009 | Kaoh .................. G09F 9/33 40/447 |
| 2014/0103122 | A1* | 4/2014 | Lundell ............ G06K 19/06112 235/494 |
| 2016/0252895 | A1* | 9/2016 | Case .................. G06Q 30/0185 700/12 |
| 2017/0094503 | A1* | 3/2017 | Iannce ............... H04N 1/32101 |
| 2019/0050830 | A1* | 2/2019 | Garner ................ G06Q 20/047 |
| 2019/0083909 | A1* | 3/2019 | Remboski ............ B01D 35/143 |
| 2021/0185051 | A1* | 6/2021 | Soryal ................ G06F 21/6218 |
| 2022/0318451 | A1* | 10/2022 | Meton ..................... G06F 30/20 |
| 2023/0136853 | A1* | 5/2023 | Xia ........................ G06F 16/953 700/79 |
| 2023/0316217 | A1* | 10/2023 | Johnson ............... G06Q 30/018 705/333 |

OTHER PUBLICATIONS

United Tank Parts Seeks Patent for Tanker Trailer Data Plates and Related Systems, Global IP News. Transportation Patent NewsNew Delhi: Pedia Content Solutions Pvt. Ltd. (Jul. 12, 2024). (Year: 2024).*
NeoMedia Partners with Texas Nameplate to Launch New Mobile Digital Nameplate Products, Business Wire: NA. Business Wire. (Jan. 29, 2009). (Year: 2009).*
PURA Sensitizes Tanker-Truck Operators On New Information System, AllAfrica.comWashington: Disco Digital Media, Inc. (Mar. 10, 2022) (Year: 2022).*

* cited by examiner

*Primary Examiner* — Matthew T Sittner
(74) *Attorney, Agent, or Firm* — Panagos Kennedy PLLC; Speros Panagos; Linda Kennedy

(57) ABSTRACT

A tanker trailer data plate and related systems are provided. The data plate includes a scannable image, which when scanned permits wireless access to information about the particular tractor trailer via a reader. The data plate, conventionally used exclusively for public information, will also permit wireless access to private maintenance data about the tractor trailer. Level of access to which maintenance data depends upon satisfaction of security level criteria.

14 Claims, 6 Drawing Sheets

TANKER TRAILER DATA PLATES AND RELATED SYSTEMS

TECHNICAL FIELD

This disclosure relates to data plates for tanker trailers and other industrial carriers that use data plates. This disclosure also relates to hardware and software systems that interface with scanned images on those data plates to access and in some cases modify data.

BACKGROUND

Tanker trailers and like heavy duty carriers have long product lives and may be rebuilt and/or maintained, sold and re-sold, over decades. The U.S. Department of Transportation (DOT) regulates many aspects of tanker trailers and may update its requirements from time to time. For example, the DOT requires certain detailed information to be present on a data plate. However, data plates often become damaged during extended use and exposure to the elements. Certain information on data plates can become unreadable. This in turn can lead an owner or lessee of tanker trailer to be out of compliance with federal regulations.

It may be useful, then, to physically protect data plates with a durable and translucent or substantially transparent cover. It may also be useful to include less information directly on the data plate, and to make such information indirectly available from the data plate. This may be done by replacing the large number of alphanumeric characters dispersed about the data plate with a smaller scannable image such as a bar code or Quick Read (QR) code. A small scannable image may have less content-based surface area that could become damaged or unreadable. Scanning the scannable image could lead to a web-based link or landing page that provides access to DOT-required information.

Additionally, older tanker trailers and like vehicles and carriers may have incomplete maintenance, repair, and usage records. The vehicle may have changed hands a number of times. The records may not be readily available when needed. Such records may be in paper form at an office or on a local computer that is difficult to access in the field. Thus, it may also be useful for systems that interface with the scannable image on a data plate to additionally provide secured access to a separate body of data such as private maintenance data that may be privately managed. It is unexpected for data plates to include information beyond what is required by regulation. It is unexpected for data plates to include secured access to maintenance data or other private, access-limited information.

At least some of the described embodiments may address one or more of issues that remain unresolved by the data plates available in the field at present.

BRIEF DESCRIPTION OF THE DRAWINGS

The embodiments set forth in the drawings are illustrative and exemplary in nature and not intended to limit the subject matter defined by the claims. The following detailed description can be understood when read in conjunction with the following drawings, where like structure is indicated with like reference numerals.

DETAILED DESCRIPTION

Figure 1:
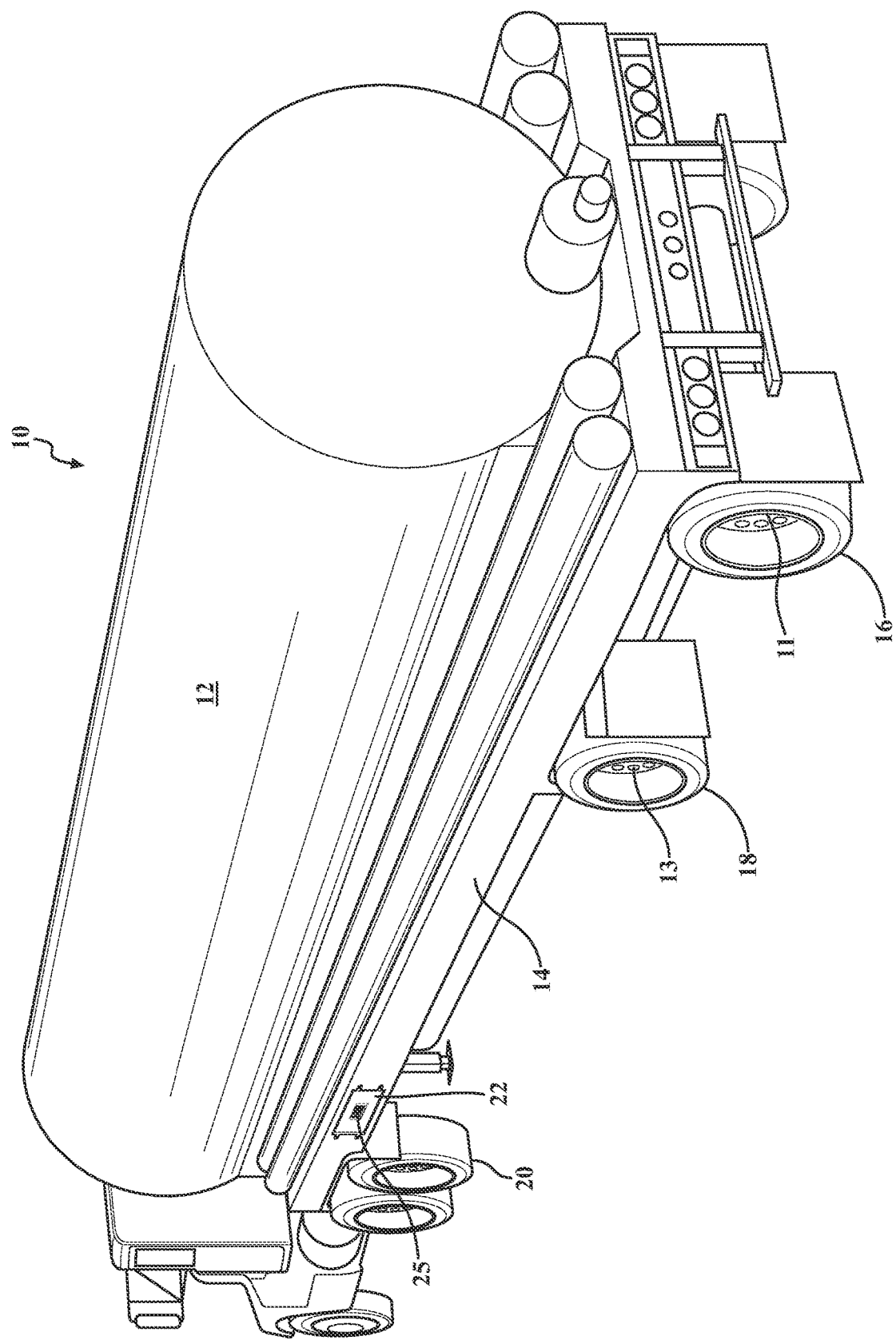
FIG. 1 is a rear perspective view of an example tanker trailer with a data plate.

Referring to FIG. 1, a rear perspective view of a vehicle pulling a tanker trailer 10 with a tank 12 affixed to a frame 14 is shown. The use of a tanker trailer 10 is this disclosure merely exemplary and non-limiting. Other industrial tanks, carriers and the like are specifically contemplated where the specification refers to tanker trailer.

Figure 4:
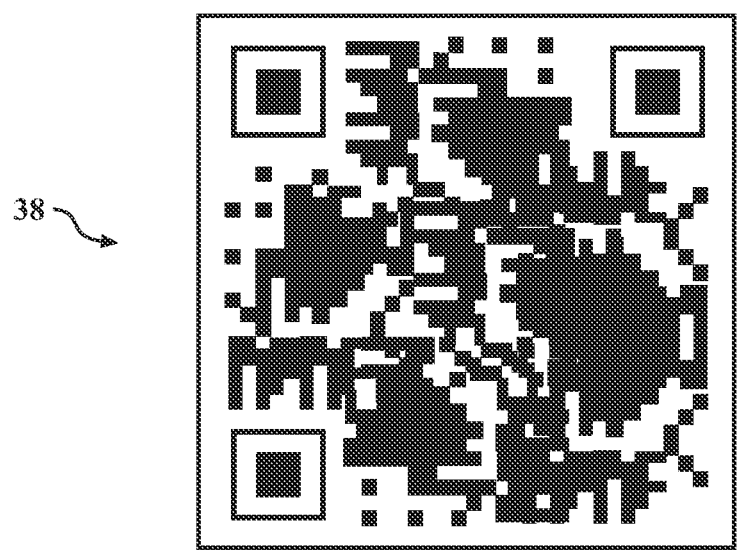
FIG. 4 is a front view of a representation of a quick read code for use with a data plate.

Wheels 16, 18, 20 are shown. It is understood that the wheels 16, 18, 20 may be mounted on rims 11, affixed to hubs by fasteners 13 affixed to axles at a first end extending transversely to the perpendicular of the trailer, and like wheels are attached to the hubs on axles at a second end so the tanker trailer 10 is rollable or moveable by way of the wheels. The tanker trailer 10 is shown with a data plate 22 having a bar code as a scannable image 25. It is understood that a QR code 38 (as seen in FIG. 4) could be used as all or part of a scannable image 25.

Data plate 22 may be made of any of a number of materials, including corrosion resistant metals. For example, data plate 22 may comprise aluminum, stainless steel, or brass or combinations. Data plate 22 may be a sticker, or a hard plastic material. In some embodiments, the data plate 22 is an electronic display like a computer monitor or a tablet screen. Where data plate 22 is an electronic display, it is in electrical communication with a power source and a controller. In such embodiments, the electronic display data plate 22 may have a mutable scannable image 25, which may be generated or updated by an approved maintenance and repair vendor. The electronic display data plate 22, when scanned, may also provide a window or an area of the display that displays portals to access data and/or data. In another embodiments, the data plate 22 may be a region on a tanker trailer 10 or frame 14 wherein the scannable image 25 is etched into or embossed onto or painted directly on the tanker trailer 10 or frame 14. In such embodiments, the data plate 22 need not be a separate piece of material from the tanker trailer 10 or frame 14.

Figure 2:
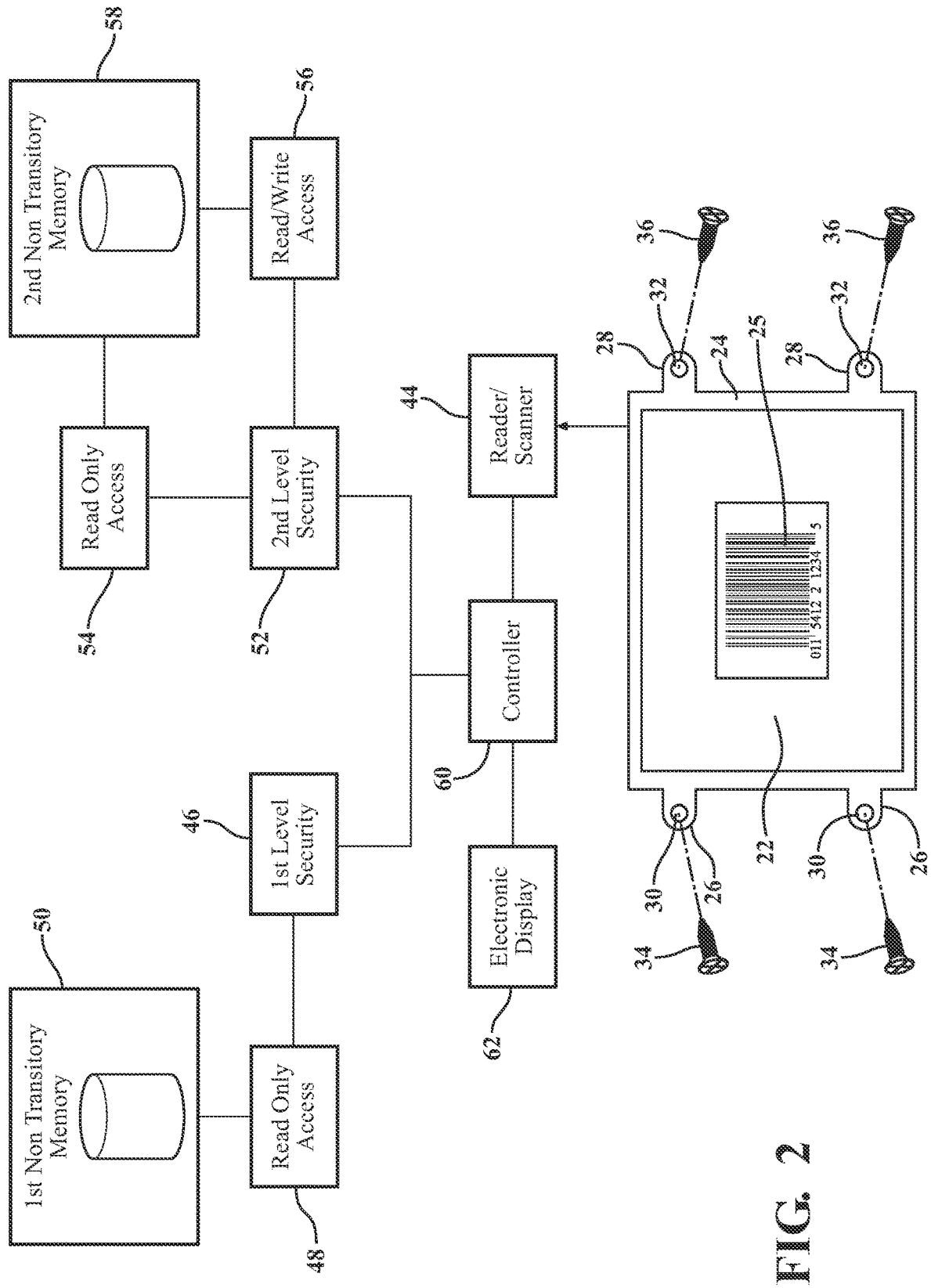
FIG. 2 is a schematic view of an example system configuration.

Referring to FIG. 2, the data plate 22 may be mounted on or otherwise attached to a plate frame 24. In the non-limiting depiction, there are two attachment flanges 26 and 28 on opposite sides of the plate frame 24. Attachment flanges 26 and 28 may be equipped with apertures 30, 32, respectfully, to receive fasteners 34 and 36, shown as threaded screws. When fastened to the tanker trailer 10 or frame 14, the plate frame 24 may support one or both of a data plate 22 and a protective cover. Other fasteners and attachment mechanisms are contemplated. In embodiments where data plate 22 is an electronic display, the electronic display may be powered with a local battery and/or in electrical communication with the electronics systems of the tanker trailer 10 or its associated vehicle.

Figure 3:
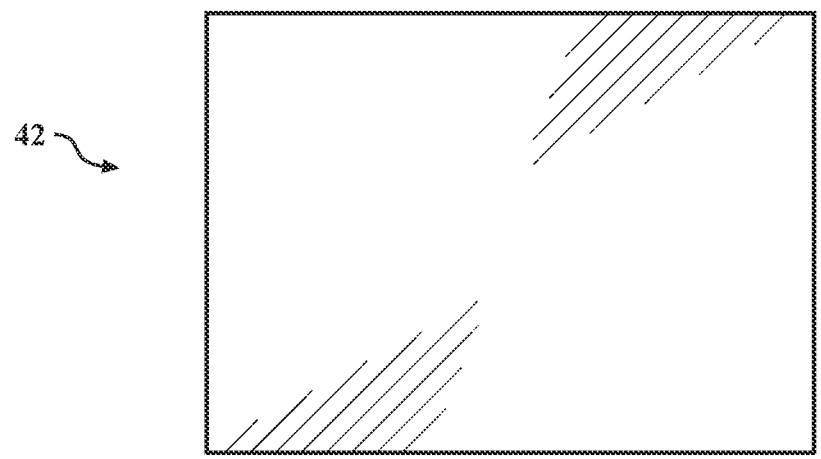
FIG. 3 is a front view of a transparent cover for a data plate.

A protective cover may be used with data plate 22. In one embodiment, a transparent protection layer 42, as seen in FIG. 3, may be placed over the data plate 22 and under elements of plate frame 24. In some embodiments, the transparent protection layer 24 is shaped like plate frame 24 with flanges and apertures for fastening. Transparent protection layer 24 may comprise plastic materials including acrylics such as polymethyl methacrylate (PMMA), polycarbonates, and combinations thereof. The transparent protection layer may include additives, including but not limited to additives for UV protection and/or toughness, tensile strength and/or impact resistance. The thickness of the transparent protection layer 42 when it is made of PMMA may range from 1 mm to 5 mm. The transparent protection layer 42 may be entirely transparent, substantially transparent, or translucent so long as the scannable image 25 may be scanned through the protective cover.

A scanner or reader 44 is shown that can scan the scannable image 25 on data plate 22. The reader 44 may be an application on mobile device with suitable scanning hardware and software, such as a smartphone, a smartphone with a secure scanning application, a tablet, a laptop computer or other device. The reader 44 contains or is in electrical communication with a controller 60, or both. The controller 60 may permit a user to access to select data in a first nontransitory computer readable memory 50 and/or a second nontransitory computer readable memory 58. The first and second nontransitory computer readable memory may be cloud-based, where the data in such memory is stored and managed in the cloud. One route to such permitted access may be via portals made available on a landing page to which a user may be led via the scannable image 25. The landing page may be provided on one of a remote computer, a remote tablet, a remote cell phone, a screen in a cabin of a vehicle pulling the tanker trailer, or in instances where a data plate 22 is an electronic display, the electronic display.

The controller 60 is also in electrical communication with an electronic display 62, which can be the data plate 24 itself or it can be a screen on a smartphone, tablet, or other remote computer. The electronic display 62 may be on the same device as reader 44 or it may be a remote device from reader 44.

The controller 60, directly or indirectly, permits access to data in a first nontransitory computer readable memory 50 when a first level of security 46 is determined. When first level security access is granted, a user has read-only access 48 to the data in the first nontransitory computer readable computer memory. In some embodiments, the first level security 46 is public access. In other embodiments, the first level security 46 requires an account with a userid and a password. In some embodiments, first level security 46 includes a landing page with portals for data access that is SSL certified and encrypted. In some embodiments, the landing page includes malware and other protections against cybercriminals. In some embodiments, first level security 46 is tiered where a subset of data is available at one tier (e.g. public) and another subset of data is available at another tier (e.g. authorized affiliates of government entities verified by at least userid and password) or with greater rights to modify data.

The controller 60, directly or indirectly, permits access to select data in the second nontransitory computer readable memory 58 when a second level of security 52 is determined. Second level security 52 may be the same as or different from first level security 46. In some embodiments, the second level security 52 requires additional security measures as compared to the first level security 46. Security measures may include password protection, multi-factor authentication and other methods. As described below, depending on the status of the second level security 52, the controller 60 permits either read-only access 54 to select data stored second nontransitory computer readable memory or a read/write access 56 access to select data in the second nontransitory computer readable memory 58. Depending on level of access, the user then accesses or modify the select data displayed on electronic display 62.

In some embodiments, second level security 46 may be tiered. A first tier may make certain data such as past inspection reports available on a read-only basis to anyone in the public who scans the scanned image. A second tier may make certain data available to those in the public who have been verified through userid and password and/or multi-factor authentication. Such a tier may be useful for owners and lessees of tanker trailers and their employees and affiliates. A third tier may make select maintenance data that is mutable (aka not static data like VINs) available to users on a read/write basis if those users have been verified through userid and password and/or multi-factor authentication. An example of mutable data is the most recent inspection date, most recent parts replaced, etc. which only approved users should be able to change. Such a tier may be useful for approved maintenance and repair vendors identified on a table that can be verified electronically through userid and password and/or multi-factor authentication. Such users may be able to access the mutable data without scanning the scanned image through an alternative pathway such as local computer access or cloud-based access.

Figure 5:
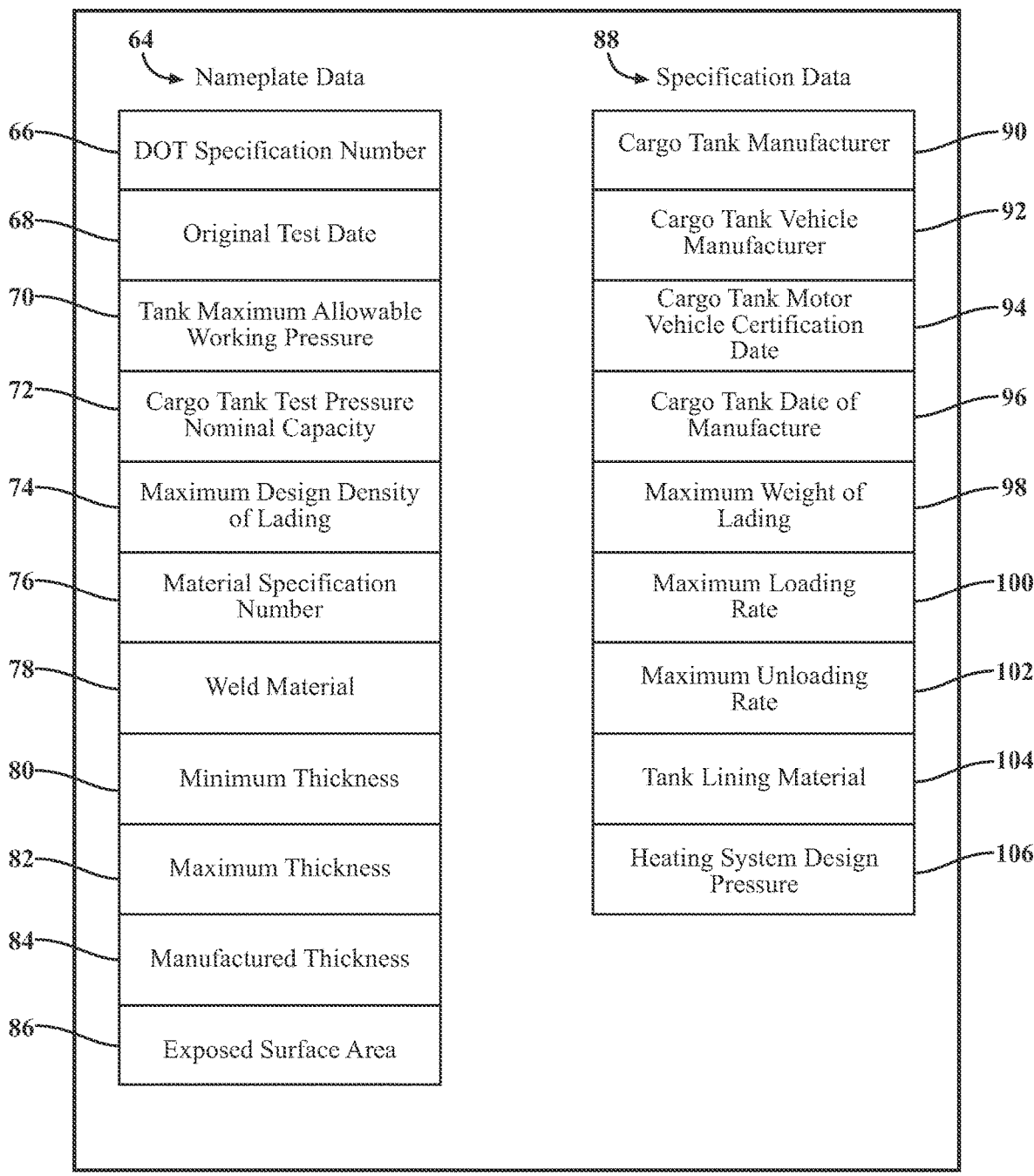
FIG. 5 is a schematic representation of the first non-transitory computer readable memory.

Referring to FIG. 5, a schematic representation of the first nontransitory computer readable memory 50 is shown. In this example, the first nontransitory computer readable memory includes data classified as nameplate data 64 and specification data 88. Generally, such information is required to be publicly accessible to government bodies and their affiliates such as employees or contractors. Conventionally, such information is printed on a physical plate and attached to a tanker trailer or frame. In this disclosure, such information is indirectly available through a scannable image on a plate. Users who pass first level security can access all such data. As above, security level one can be made available to all who scan the scannable image, or to a subset of users.

Nameplate data 64 may include DOT specification number 66 for operation of the vehicle. This includes the requirements for requalification of specification of cylinders. The original test date 68 is accessible in the medium as is the tank maximum allowable working pressure 70. The data includes cargo tank test pressure minimum capacity 72, maximum design density of lading specification 74 as well as the material specification umber 76 of the tank. Also stored in the nameplate data 64 are the weld material 78 used to weld the tank, the medium thickness of the tank wall 80, maximum thickness of the tank wall 82 and the manufactured thickness of the tank wall 84. In addition, the exposed surface area of the tank 86 is also stored in nameplate data 64.

The first nontransitory computer readable memory 50 also includes specification data 88, as previously stated. The specification data 88 may include the identity of cargo tank manufacturer 90 as well as the identity of the cargo tank vehicle manufacturer 92. In addition, the specification data 88 may include the cargo tank motor vehicle certification date 94, and the cargo tank date of manufacture 96. Other specification data 88 may include the maximum weight of lading 98, the maximum loading rate of the tank 100, the maximum unloading rate for the tank 102, the lining material for the tank 104 and any tank heating system design pressure 106.

Conventionally, data plates provide only direct access to certain public information as required for compliance with government regulations. By contrast, in this disclosure, the data plate 22 provides indirect access to a greater quantity of data, including public data and private maintenance data, where at least some of private maintenance data may not be meant for public consumption.

Figure 6:
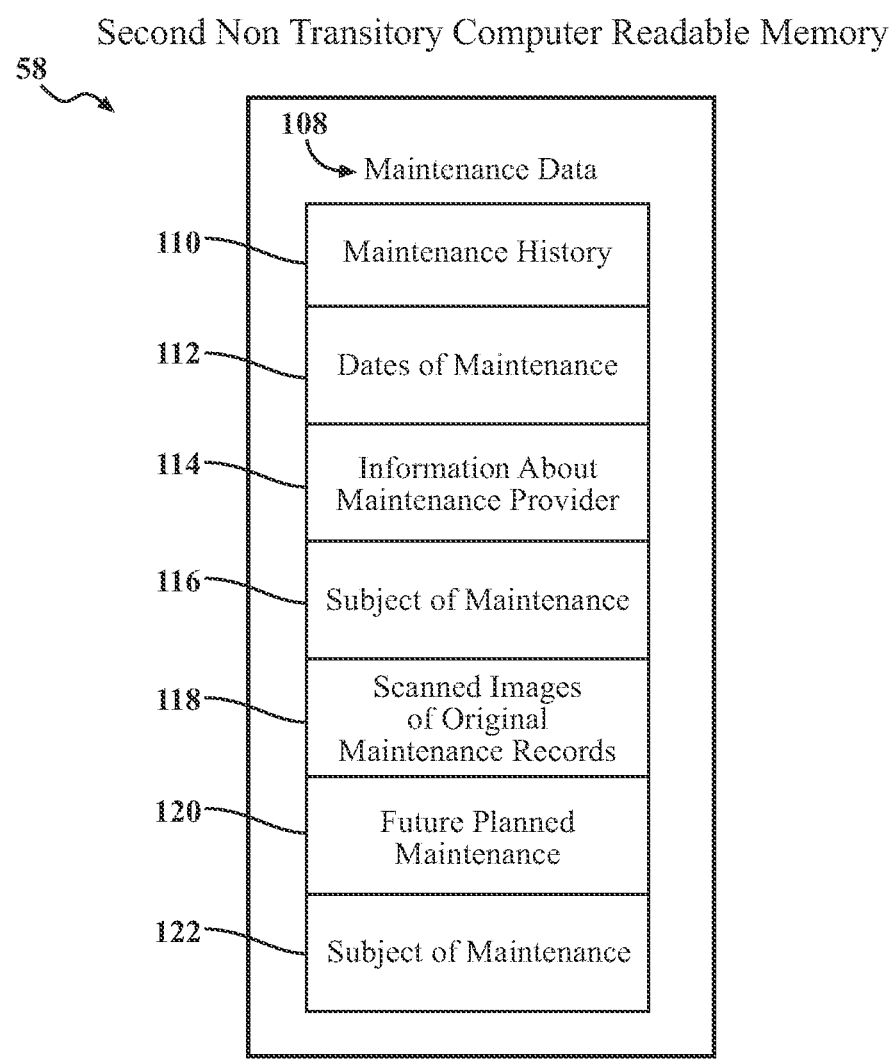
FIG. 6 is a schematic representation of the second non-transitory computer readable memory.

Referring to FIG. 6, a schematic representation of the second nontransitory computer readable memory 58 is shown. Some subsets of maintenance data 108 may be public, and some subsets of maintenance data may be private. In some embodiments, a system can be configured to permit subscribers only who meet a second level security (aka verified subscribers) to have access to maintenance data.

Maintenance data 108 may be stored therein, as well as the maintenance history 110 of the tank and vehicle and the dates of the maintenance was performed 112. Information about the maintenance provider 114 is also included, as well as the subject of the maintenance performed 116 in the past. A scanned image of the original maintenance records 118 may be included, which may be useful when a vehicle or tanker trailer is sold. Maintenance data may additionally include inspection reports, scanned images of inspection reports, past repair dates, past repair actions, past repair warranty information, past component replacement dates, replacement component identity by art or manufacturer or both, replacement component warranty information, service provider identity, and service provider licensure information such as license number and expiration date. In some embodiments, for convenience, it may be advantageous to make inspection reports accessible to the public after they have been scrubbed for personally identifying information. Other subsets of maintenance data 108 may be available for public access where such data is scrubbed for personally identifying information.

Future maintenance to be performed (or that is planned) 120 is included as maintenance data 108. This may include the subject matter of the maintenance to be performed 122. Maintenance data 108 may also include a summary page showing key information at a glance, including "next" dates for particular preventative maintenance data. Preventative maintenance data may include dates for next planned service events, brief description of planned service events including one or more of planned inspections of one or more of connections, tires, brakes, lights, safety equipment, pump equipment, blowers, and planned cleaning of tanker interior. In some embodiments, a system can be configured to generate alerts to remind authorized users in advance of when such preventative maintenance events are scheduled. In some embodiments, a system can be configured to generate alerts when scheduled maintenance becomes overdue. Alerts can be sent via text, email, phone or other mechanism to authorized users and/or subscribers to a service offered by a maintenance or repair vendor.

Having described the system and the non transitory computer readable memories useful in the disclosure, attention to directed to methods of providing access to same.

Figure 7:
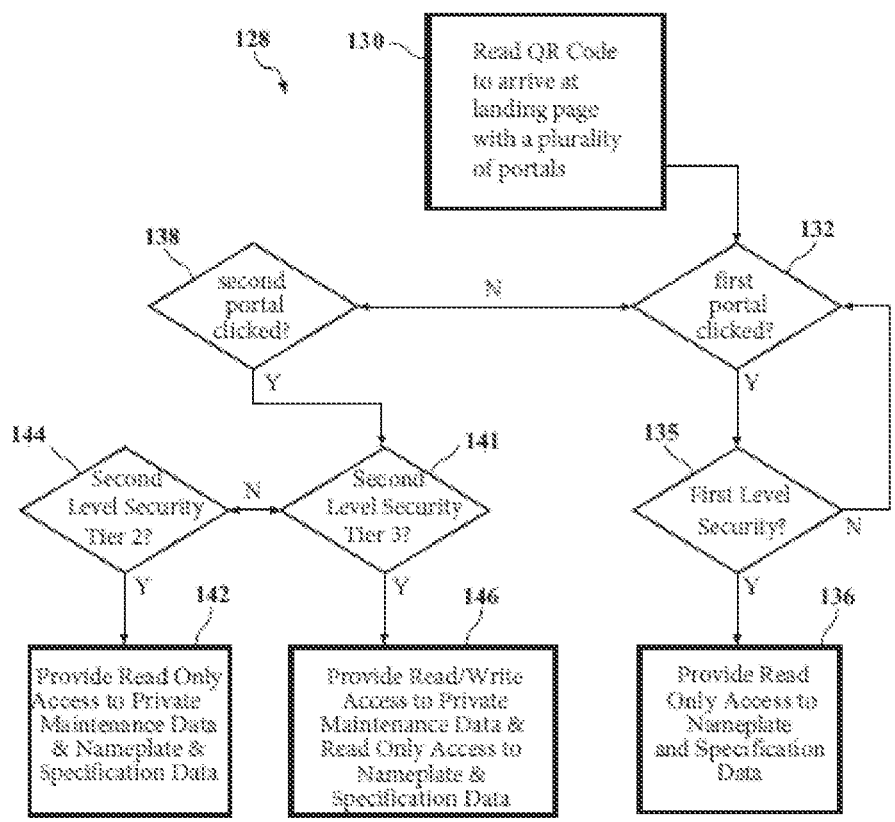
FIG. 7 is a flow chart showing an example method for accessing data stored in a first and second non-transitory computer memory.

Referring to FIG. 7, a flowchart of one non-limiting method 128 for using the described methods and system to access and in some instances modify data is described. In this example, step 130 is reading the scanned image, which happens to be a QR code, on a data plate 22. The image is wirelessly communicated with and processed by a controller, which causes directly or indirectly a landing page to open. The landing page may include one or more portals through which certain access to certain data may be given. In one example, a landing page may have a first portal (for example, a button that provides a link) for access to traditional data plate information, and a second portal for access to maintenance data. Text on the buttons might read "Data Plate Info" for the first portal and "Maintenance Data" for the second portal. Other configurations, labels and flows are contemplated. In one embodiment, there may be buttons with labels such as "View Data Plate," "View Maintenance Data," and "Update Maintenance Data."

In step 132, the system determines whether the first portal, in this non-limiting example a button, has been clicked. If so, step 135 is next. In step 135, the system determines whether a predetermined first level security has been satisfied. In this example, the predetermined level is not tiered. The predetermined level is for all who clock the first portal, whether it is set to "none", password required, or multifactor authentication. If step 135 is satisfied, the system moves to step 136 and provides read only access to nameplate data and specification data. The accessed data can be displayed on an electronic display. If step 135 is not satisfied, access is denied and a loop ensues.

If step 132 is not satisfied because the first portal has not been clicked, then step 138 is next. In step 138, it is determined whether the second portal has been clicked. If not, no access is given. If the second portal has been clicked, step 141 is next. In step 141, the system determines whether a predetermined second level security has been satisfied. In this example, second level security is tiered. In this example, second level security tier 3 may be set to levels higher than tier 2 because users with Tier 3 access have read/write access to certain mutable data and tier 2 users have only read-only access to select data. If step 141 is satisfied, the system moves to step 146 and provides read/write access to mutable maintenance data and read only access to nameplate and specification data. The data appears on an electronic display, and one or more processors accept and process wireless or hardwired input from the approved user to update and/or otherwise modify the data and display the updated or modified data. In some embodiments, users predetermined to have a heightened level of authority such as approved maintenance and repair vendors may use alternative routes to the data that do not require scanning the QR code.

If step 141 is not satisfied, step 144 is next. If the heightened tier of second level security was not met, it is possible a lower tier may be met, where such lower tier has protections greater than public access. In step 144, it is determined whether a user satisfies second level security tier 2. If so, the system moves to step 142 and provides read only access to certain private maintenance data and read only access to nameplate and specification data. If not, the system moves to step 141, which is not likely to be met for users who do not satisfy Tier 2, and access is denied and a loop ensures.

Alternative arrangements and sequencing of security checks are contemplated. For example, the landing page could simply call for entry of a userid and password. The system could process that input and check it against a table where authorized users have pre-assigned levels of access based on affiliation with one of a government agency, tanker trailer owner or lessee, or maintenance and repair vendor. Once verified, the pre-assigned level of access is given to the user. Alternatively, even when verified, read-only access may be given until a user attempts to modify, add or update data. When that action occurs, the system may require additional security such as multifactor authentication to provide additional assurance the user is the person listed in the table.

Embodiments are envisioned where there is a second level security tier 1 with lower security requirements. This level may include public access to certain maintenance records that have been scrubbed for personally identifying information and that are convenient to have on demand. For example, second level security tier 1 may provide public access to scrubbed inspection reports.

Referring generally to the entirety of above description and material incorporated by reference, the text and drawings shall be interpreted as illustrative rather than limiting. Changes in detail or structure may be made without departing from the present disclosure. Various embodiments are described above to provide a general understanding of the overall structure and function of the system and method of operation. Particular configurations, assemblies, or components and functions described with respect to one embodiment may be combined, in whole or in part, with those of other embodiments. Well-known operations, components, and elements such as simple attachment devices have not been described in detail so as not to obscure the embodiments described in the specification. While processes, systems, and methods may be described herein in connection with one or more steps in a particular sequence, such methods may be practiced with the steps in a different order, with certain steps performed simultaneously, with additional steps, and/or with certain described steps omitted.

All references to electronic controllers such as electronic controller 60r are to be broadly construed. An electronic controller may include a processor, including a programmable microprocessor and/or microcontroller. An electronic controller may include an application specific integrated circuit (ASIC). An electronic controller may include a central processing unit (CPU), a memory (e.g., a non-transitory computer-readable storage medium), and/or an input/output (I/O) interface. An electronic controller may be configured to perform functions with programming instructions embodied in software and/or hardware. An electronic controller may include a plurality of controllers. An electronic controller may include a conventional processing apparatus, which can execute preprogrammed instructions. To the extent that the described methods are embodied software, the software can be stored in memory and can perform such methods. An electronic controller may have ROM, RAM, and/or a combination of non-volatile and volatile memory so that any software may be stored while allowing storage and processing of dynamically produced data and signals.

Words referring to relative position (upper, lower, upward, downward, top, bottom, above, below, vertical, horizontal, etc.) are only used to aid understanding of the disclosure, and do not create limitations, particularly as to the position, orientation, or use of embodiments. Similarly, words describing connections (attached, connected supported, fitted, etc.) are to be construed broadly and may include intermediate members between a connection of elements and relative movement between elements. As such, these references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive.

The invention claimed is:

1. A device for a tanker trainer, comprising:
   a plate comprising a scannable image, wherein the scannable image is part of an interface configured to enable wireless access to a combination of
   one or more nameplate data, specification plate data, and maintenance data about the tanker trailer, wherein the nameplate data and specification plate data are stored on a first non-transitory computer readable medium, and
   the maintenance data about the tanker trailer is stored in a second non-transitory computer readable medium; and the scannable image enables access to the maintenance data only after the image is scanned using a controller with software configured to interface with the image and initiate a wireless communication with the second non-transitory computer readable medium, wherein the wireless communication includes at least one level of security.

2. The device of claim 1 wherein the plate comprises corrosion resistant metal or a sticker.

3. The device of claim 1 wherein the plate comprises an electronic display in electrical communication with a power source and a controller.

4. The device of claim 1 further including a protective cover over at least a portion of the plate and a plate frame to support one or more of the plate and the cover.

5. The device of claim 1 wherein the scannable image comprises at least one of a bar code or a quick response (QR) code.

6. The device of claim 1 wherein the nameplate data comprises one or more of a DOT specification number, an original test date, a tank maximum allowable working pressure, cargo tank test pressure, nominal capacity, maximum design density of lading, material specification number, weld material, minimum thickness, maximum thickness, manufactured thickness, and exposed surface area.

7. The device of claim 1 wherein the specification data comprises one or more of cargo tank vehicle manufacturer, cargo tank motor vehicle certification date, cargo tank manufacturer, cargo tank date of manufacture, maximum weight of lading, maximum loading rate, maximum unloading rate, lining material, and heating system design pressure.

8. The device of claim 1 wherein the maintenance data comprises maintenance history including one or more of inspection reports, scanned images of inspection reports, past repair dates, past repair actions, past repair warranty information, past component replacement dates, replacement component identity by part or manufacturer or both, replacement component warranty information, service provider identity, and service provider licensure information.

9. The device of claim 1 wherein the maintenance data comprises preventative maintenance data including one or more of summary information of maintenance history, dates for next planned service date events, brief description of planned service events including one or more of planned inspections of one or more of connections, tires, brakes, lights, safety equipment, pump equipment, blowers, and planned cleaning of tanker interior.

10. The device of claim 9 configured to send maintenance alerts via text or email to authorized users in advance of upcoming planned service events or following overdue planned service events.

11. The device of claim 1 wherein the nameplate data and specification data have a first level security, wherein the security is one or more accessibility in read-only form to the public, or accessibility in read-only form to affiliates of select government entities via verified accounts with userids and passwords.

12. The device of claim 1 wherein the maintenance data has a second level security having a plurality of tiers, wherein a first tier makes read-only past inspection reports publicly available and a second tier makes all other maintenance data accessible in read only form to users with verified accounts with userids and passwords, and a third tier makes select maintenance data read/write accessible to users with one or more of verified accounts with userids and passwords and multi-factor authentication.

13. The device of claim 12 wherein the second tier of second level security is provided for users affiliated with an owner or licensee of the trailer and the third tier of second level security is provided for users affiliated with an approved maintenance or repair vendor.

14. The device of claim 13 wherein users satisfying the third tier second level security have access to maintenance data through both scanning the scannable image and through an alternative pathway not requiring scanning of the scanned image, the alternative pathway being a local or cloud-based access.

* * * * *